United States Patent Office 3,257,362
Patented June 21, 1966

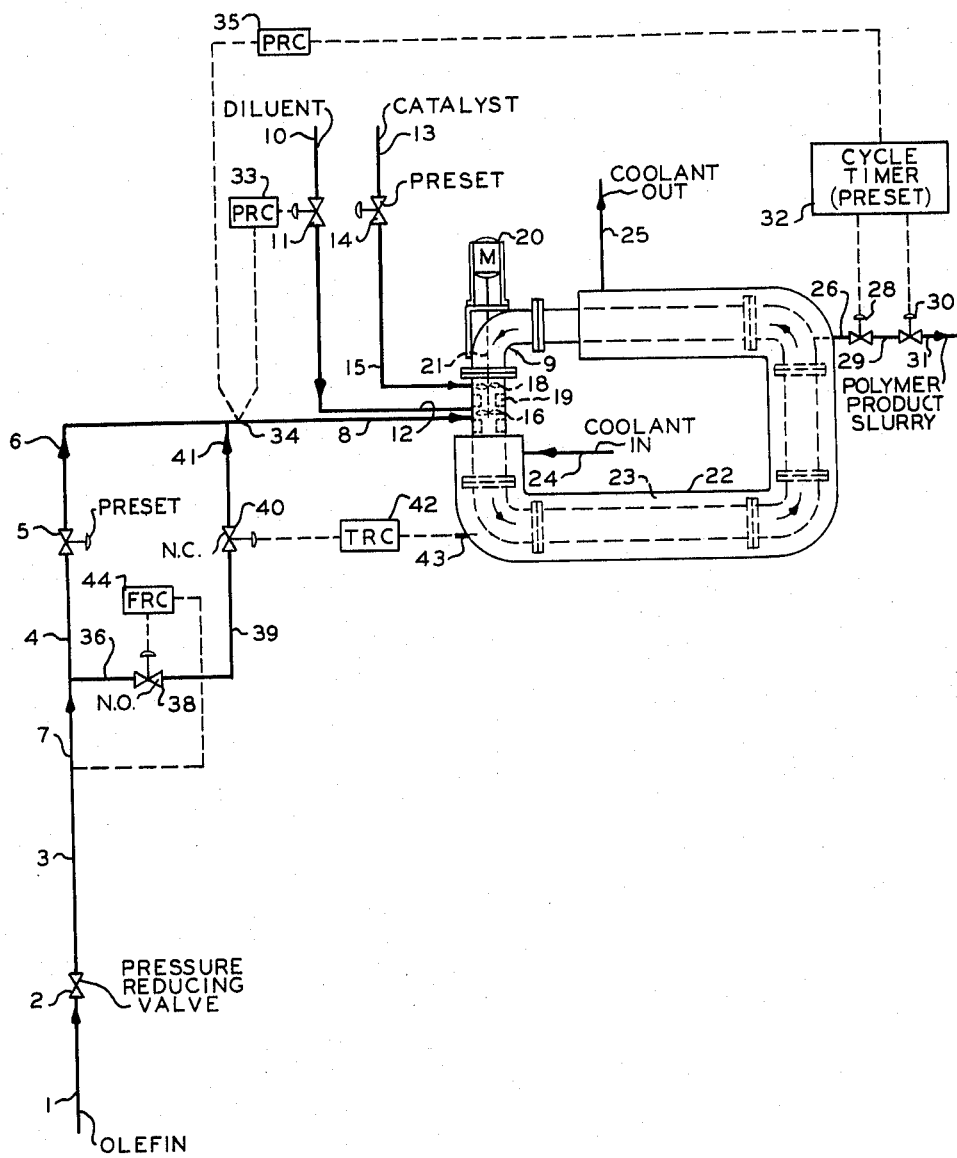

3,257,362
CONTROL OF OLEFIN POLYMERIZATION
REACTIONS
Donald D. Norwood, Bartlesville, Okla., assignor to Phillips Petroleum Company, a corporation of Delaware
Filed Nov. 21, 1960, Ser. No. 70,516
14 Claims. (Cl. 260—88.2)

This invention relates to the controlling of olefin polymerization reactions. In another aspect, the invention relates to an improved method and apparatus for controlling the polymerization of 1-olefins in continuous path reactors.

Various methods are described in the literature for producing normally solid and semisolid polymers from hydrocarbons, such as 1-olefins. Recently, considerable attention has been directed toward the polymerization of solid olefin polymers, such as polymers of ethylene and/or propylene, in the presence of a solid catalyst utilizing a liquid diluent as the reaction medium. One method of carrying out the polymerization of olefins is the so-called "particle form" process which results in the formation of a solid polymer in a diluent. The use of a medium that is not a solvent for said solid polymer eliminates the necessity for such subsequent steps as precipitation of the polymer from the solvent. A particularly suitable method is described in my copending application, Serial No. 819,391, filed June 10, 1959, now abandoned. In this copending application method and apparatus are described for carrying out the polymeriaztion reaction in a tubular closed loop reaction zone having smooth surfaces. The catalyst, liquid diluent and hydrocarbon reactants are continuously propelled through the reaction zone at a velocity in the highly turbulent flow range, in some instances in the area of 21 feet per second, thereby producing a solid particle form polymer product which is then withdrawn from the reaction zone. Means are disclosed therein for converting the rotational energy of the propellers into flow energy with a minimum loss of energy.

One difficulty that has been encountered in the utilization of the tubular closed loop type reactors is the lack of a completely effective method of controlling the reaction within the loop. Various methods and schemes have been proposed but have not proven entirely successful in maintaining the required reaction zone pressure while simultaneously withdrawing polymer product from the zone. The withdrawal of polymer product from the reactor necessarily results in the withdrawal of at least some of the diluent as well as catalyst and olefin. Therefore, when a portion of the reactor contents are periodically withdrawn, the liquid level within the reactor drops if the diluent input is maintained substantially constant. Since the product withdrawal is generally periodic rather than continuous, this makes it difficult by heretofore proposed methods to control the liquid level within the reactor. If the reactor is not maintained liquid full, monomer saturation may result which is undesirable.

It is an object of this invention to provide an improved method and apparatus for controlling catalyzed reactions.

Yet another object of this invention is to provide an improved method and apparatus for controlling the reaction conditions in an olefin polymerization reactor.

Still another object of this invention is to provide an improved polymerization process and apparatus for producing a polymer product having uniform properties.

Still another object of the present invention is to provide an improved process and apparatus for controlling olefin polymerization reactions occurring in continuous path loop reactors.

These and other objects and aspects of the invention, as well as the several advantages of the invention, will become apparent to one skilled in the art from the following detailed description, discussion and the appended claims.

The foregoing objects are accomplished broadly for a polymerization reaction comprising contacting a 1-olefin with a catalyst and a diluent within a smooth continuous path reaction zone in turbulent flow at a temperature such that substantially all of the polymer produced is insoluble in said diluent and is in the form of solid particulate polymer having a density greater than said diluent and polymer is periodically removed from said reaction zone by the method of this invention by (1) varying the quantity of diluent introduced into said reaction zone inversely proportional to the pressure within said zone and (2) varying the quantity of polymer product withdrawn from said zone proportional to the pressure within said zone when said pressure attains a predetermined maximum. Even more preferably, the pressure within the reactor is determined by measuring the pressure in the incoming olefin feed conduit which is, of course, directly proportional to the total pressure within said zone. Unless specified otherwise, pressure as defined herein, refers to the total pressure within the loop reactor, i.e., hydraulic pressure plus vapor pressure.

In another aspect of the invention the heat of reaction is removed from the reaction zone by means of heat exchange material in heat exchange relationship therewith and the quantity of olefin introduced to said reaction zone is varied as the temperature within said heat exchange material changes. Preferably, the quantity of olefin is varied inversely proportional to said temperature until the flow rate reaches a predetermined maximum, then the quantity is governed by flow rate rather than temperature.

It is disclosed in Hogan et al., U.S. Patent 2,825,721, that unique polymers and copolymers can be produced by contacting one or more olefins with a catalyst comprising as an essential ingredient chromium oxide, preferably including a substantial amount of hexavalent chromium. The chromium oxide is associated with at least one other oxide particularly selected from the group consisting of silica, alumina, zirconia and thoria. The olefin feed used for the polymerization is at least one olefin selected from 1-olefins having a maximum of 8 carbon atoms per molecule and no branching nearer the double bond than the 4-position. Examples of olefins which can be polymerized by the described method include ethylene, propylene, 1-butene, 1-pentene and 1,3-butadiene. Copolymers, such as ethylene-propylene copolymers and ethylene-butadiene copolymers, can also be prepared by utilizing the chromium oxide containing catalyst. The olefins are polymerized in the presence of a hydrocarbon diluent, for example, an acyclic, alicyclic or aromatic compound which is inert.

Recently it has been discovered that there is a critical polymerization temperature range within the broad range disclosed by Hogan et al. in which it is possible to produce increased yields of high molecular weight polymers of ethylene which are insoluble in the hydrocarbon diluent. This polymer is formed in association with the polymerization catalyst and is suspended in the liquid diluent in solid particle form. The preparation of insoluble particle form polymer is disclosed in the copending application of Leatherman et al., Serial No. 590,567, filed June 11, 1956, now abandoned. In the following discussion the term "particle form polymer" will be employed to designate the insoluble polymers of ethylene formed in accordance with the Leatherman et al. application.

Particle form polymer can be prepared from ethylene and from mixtures of ethylene with other unsaturated hydrocarbons, for example, mixtures of ethylene with minor amounts of higher 1-olefins, such as propylene, 1-butene, 1-pentane, 1-hexene, and the like. Examples of comonomers which can be used with ethylene include 1-olefins having no branching nearer the double bond than the 4-position and conjugated and non-conjugated diolefins. The polymerization reaction is carried out in the presence of a liquid hydrocarbon diluent which is inert in the polymerization reaction and in which the majority of the polymer is insoluble under reaction conditions. Suitable diluents include paraffins such as those having from 3 to 12 and preferably 3 to 8 carbon atoms per molecule, for example, n-butane, n-pentane, isopentane, n-hexane, n-decane, etc., saturated cyclic hydrocarbons such as cyclohexane, cyclopentane and methylcyclopentane, methylcyclohexane, etc. The polymerization reaction temperature will vary depending on the particular liquid diluent which is employed and on the olefin reactants. Usually, however, polymerization is carried out at 230° F. and below, preferably between about 225° F. and about 150° F. The olefin reactants are contacted in the polymerization zone with a suspension of subdivided chromium oxide catalyst in the liquid hydrocarbon diluent under the aforementioned temperatures and under pressures suitable to maintain the diluent in the liquid phase. Concentration of the catalyst in the reaction zone can vary widely; however, generally it will be in the range of 0.001 to 5 percent by weight based on the liquid hydrocarbon diluent. For a more detailed description of the polymerization process including reaction conditions, catalyst, etc., reference can be had to the copending application of Leatherman et al., Serial No. 590,567, filed June 11, 1956.

This invention is described with reference to a simplified polymer product withdrawal means whereby a polymer slurry is discharged from said zone and entrapped between two valves forming a lock from which polymer product slurry is periodically removed. It will be readily seen by those skilled in the art that many modifications of the polymer product recovery means are within the scope of the invention.

An important consideration in the operation of the loop reactor at optimum conditions for polymerization of olefin is the maintenance of a liquid-full reactor. By the method and apparatus of this invention the reactor is maintained liquid-full by adjusting the diluent feed rates to correspond with the product removal rates thereby permitting the introduction of a constant amount of catalyst into the reaction zone. Due to the variable activity of the catalyst for the polymerization of olefins the reaction rate will increase or decrease; for instance, when the catalyst activity decreases, the rate of polymer production will decrease correspondingly thereby resulting in an increase in the amount of olefin within the reactor. When the polymer product slurry is withdrawn at a substantially constant rate, the liquid level is reduced thereby permitting the existence of a gas phase within the loop reactor. This gas phase is especially undesirable when using a propelling means such as described in the drawing because of cavitation around the propeller causing a very inefficient translation of rotational energy into flow energy. The reduction in liquid level results in a reduction in hydraulic pressure which is readily determinable.

By the method of this invention, the amount of diluent being introduced into the reaction zone is decreased when the pressure therein has increased, and vice versa, so as to maintain a liquid-full reaction zone. However, when the catalyst activity, or productivity, decreases as hereinbefore described, it is then necessary to compensate for this reduction in liquid level caused by this additional factor. By the method of this invention the product withdrawal rate is maintained substantially constant until the pressure within the reactor attains a predetermined maximum at which time the withdrawal rate is increased proportional to the pressure within the reactor, and vice versa. This is conveniently taken care of by a pressure override on the time cycle controller for the product withdrawal.

In one aspect of the invention, the quantity of olefin introduced to the reaction zone is maintatined substantially constant by means of a preset flow rate through a bypass valve until the reaction has begun, at which time the temperature therein will increase resulting in a temperature decrease within the coolant or heat exchange fluid since the flow of heat exchange fluid will generally be increased in response to reactor temperature by suitable control means. This temperature decrease in the coolant is sensed by a thermocouple, or other temperature sensing means, transmitted to a temperature recorder controller which then causes a motorized override valve to gradually open thereby permitting the introduction of an increased quantity of olefin. This temperature recorder controller adjusts the rate of olefin introduction until the quantity of olefin entering the reactor reaches the quantity preset on a flow recorder controller which then takes over from the temperature recorder controller and regulates the amount of olefin introduced at a predetermined flow rate for the remainder of the reaction period. Of course, the mechanism will function, not only during start-up, but when the reaction is terminated due to saturation.

The invention is best described by reference to the accompanying drawing and specific embodiment. Although the invention will be herein described with reference to the utilization of specific materials and specific apparatus, it is to be understood that the invention is not to be so limited.

Olefin feed, from a source not shown, is introduced into the system through conduit 1 at a rate of 14,800 lb./SD [1] of ethylene and 1,000 lb./SD [1] of butene-1 and reduced in pressure to a substantially constant pressure of 500 p.s.i.g. by means of pressure reducing valve 2. Prior to the initiation of the reaction, the olefin feed continues through conduits 3, 4, bypass valve 5 and conduits 6, 8 into loop reactor 9. Manually operated valve 5 is preset so as to introduce the olefins at a predetermined rate less than that required during the reaction. Catalyst, preferably admixed with pentane to form a slurry, is introduced into the system at a rate of 7 lb./SD [1] through conduit 13, preset manually operated valve 14 and conduit 15 into the reactor 9 so as to provide a substantially constant rate of catalyst introduction into the reactor. The catalyst has a productivity of 2100 lb. of polymer per lb. of catalyst.

Liquid n-pentane is introduced into the reactor as a diluent at a rate of 16,400 lb./SD [1] through conduit 10, valve 11 and conduit 12. As discussed hereinbefore, the quantity of diluent introduced into the reactor is varied by means of pressure recorder controller 33 which receives a signal from pressure sensing means 34, disposed in the olefin feed conduit and then controls motor valve 11 so as to vary the quantity of diluent inversely proportional to the pressure within the reactor. In other words, when the pressure within the reaction zone decreases, due to the periodic withdrawal of polymer product, the quantity of diluent is increased proportionately. It will be obvious to those skilled in the art that pressure sensing means 34 may be of any type known to the art and may determine the pressure within the reactor by direct contact with the interior of the reactor or by indirect means, such as determining the pressure within the incoming olefin conduit which is in open communication with the reactor interior. This latter method is frequently preferred when operating a liquid full reactor.

It is preferred to introduce the olefin, diluent and catalyst into a section of the reaction zone having a maximum turbulence, which in the case of the loop reactor illustrated in the drawing is generally in the area of the propellers 18, 16.

The reactor 9 is oblong in shape and made of flanged, straight pipe sections and L's joined together to provide a continuous flow path which is substantially free from obstructions and contains 2,650 gallons and has a ---
[1] Stream day.

uniform 16-inch internal diameter except in the section housing the impeller which has an 18-inch I.D. The reactor is maintained at a temperature below 230° F., preferably in the range of about 150 to 225° F., and a hydraulic pressure of 465 p.s.i.a. with a vapor pressure of 265 p.s.i.a. The concentration polymer within the reactor is about 18 weight percent and the residence time is about 3 hours.

The reactor is jacketed by section 22 which forms an annular space 23 with the reactor 9. By means of coolant inlet 24 and outlet 25, a heat exchange fluid, e.g., water, is permitted to flow through annular space 23 at a rate sufficient to control the temperature of the reactants within the desired range. Thermocouples, or other temperature sensing means, are provided for sensing the temperature in the exchange fluid and reactor. Provision can be made to transmit the reactor temperature to a temperature recorder controller, not shown, which can be utilized to assist in the control of the reactor temperature. The heat exchange fluid enters at 177° F. and exits at 184° F.

Various temperature control methods can be used including control of the heat exchange fluid to jacket 23, control of the quantity and/or temperature of reactants entering the reactor, control the amount of catalyst entering the reactors, etc., within the scope of this invention.

Vertically disposed drive shaft 21 connects to propellers 16, 18. Suitable means can be provided, such as variable speed motor 20, for actuating the drive shaft 21, and propellers 16, 18. Considerable rotational energy is provided by propellers 16, 18 and this is more efficiently converted to flow energy by straightening vanes 19 formed by metal plates projecting perpendicularly from the inner wall of the reactor and positioned adjacent to propellers 16, 18.

While the drawings illustrate propeller means for imparting flow to the reactor contents, it is within the scope of the invention to provide other types of motive power. For example, the propellers can be replaced by a pump of the impeller type. With a suitably designed pump, namely one which provides a maximum of flow energy, it is possible to reduce or entirely eliminate the use of straightening vanes in the reactor. Any conventional driver, such as a motor, turbine, etc., can be utilized for actuating the propellers, pump or other motive means provided for moving the reactor contents.

After the initial introduction of diluent, catalyst and olefin, the polymerization reaction is initiated. Since the polymerization reaction is exothermic, the temperature of the coolant circulating in the annular space 23 will be decreased by suitable control means (not shown) to prevent the reaction temperature from using above the desired level. In a preferred embodiment of this invention, this temperature decrease within the coolant is utilized to effect a more refined control over the quantity of olefin introduced into the reactor during the start-up of the reaction. The temperature decrease is sensed by temperature sensing means 43, such as a thermocouple, and a signal is transmitted to temperature recorder controller 42. This signal actuates valve 40 which is normally closed. Since valve 38 in this same conduit is normally open, this permits an increase in the quantity of olefin being introduced into the reaction zone. However, to prevent an excessive quantity of olefin being introduced into the reactor, flow recorder controller 44 receives a signal from flow sensing means 7 in conduit 3 which actuates valve 38 when the flow rate exceeds a predetermined value. The net effect of these operations is to permit the bypassing of the olefin through conduits 4 and 6 during the initial startup of the reactor zone, the control of the quantity of olefin during the initial reaction period by means of temperature recorder controller 42 and finally the ultimate control of the quantity of olefin introduced into the reaction zone by flow recorder controller 44. However, during this latter period of control, preset valve 5 may remain open if desired.

Since the loop reactor is maintained at superatmospheric pressure, viz., 465 p.s.i.a., the product withdrawal means must permit the withdrawal of solid polymer product from the reactor at a rate of 12,910 lbs./SD with a minimum of loss of pressure and diluent therefrom. Ethylene conversion efficiency is 87 weight percent while butene-1 conversion efficiency is 13.5 weight percent. For purposes of simplification, the drawing is limited to the illustration of a simple lock type device for the removal of solid polymer product from the loop reactor. Included with the withdrawn polymer product is 15,200 lbs./SD of n-pentane, 7 lbs./SD catalyst, 1,890 lbs./SD of ethylene and 865 lbs./SD of butene-1. Since the product must be ultimately removed into a zone of approximately atmospheric pressure, the n-pentane and reactants are rapidly evaporated and these expanded gases may be used to propel the polymer product through the conduit to the product polymer recovery zone (not shown).

As illustrated in the drawing, two valves are incorporated within the conduits 26, 29, 31 to permit the entrapment of a portion of the polymer product slurry. Periodically, the first valve 28 is opened and the second valve 30 is closed thereby entrapping a quantity of polymer product slurry in the conduit section 29. Valve 28 is then closed and valve 30 is opened to permit the escape of polymer with a small amount of accompanying diluent and reactant. The valve or the series of valves are normally fully opened and fully closed and are preferably operated on a timed cycle, such as with cycle timer 32 which is preset at a predetermined rate based on the amount of catalyst added through conduit 15. The polymer product slurry is then removed to a polymer product recovery zone where the polymer is separated from the hydrocarbon diluent and reactants and processed. The rate of diluent input is then temporarily increased to make up the loss of diluent and to maintain a liquid-full reactor.

By the method and apparatus of this invention, provision is made for the overriding of cycle timer 32 to permit a variation in the quantity of product removed from the reaction zone. Most conveniently, this polymer product withdrawal rate variation is based on the pressure within the reaction zone 9. Since the pressure of the incoming olefin gas in conduit 8 is indicative of the pressure within the reactor 9, a determination of this pressure by pressure sensing means 34 disposed in said conduit provides a measure of the reaction rate. A signal is transmitted from pressure sensing means 34 to pressure recorder controller 35 when said pressure exceeds a predetermined maximum, e.g., 500 p.s.i.a., to override cycle timer 32 thereby permitting a variation in the product withdrawal rate. Thus, by the method and apparatus of this invention, the polymerization is continuously controlled and the reactor maintained liquid-full by the dual variation in the amount of diluent introduced into the reactor when product is withdrawn and the amount of product withdrawn from the reactor when the productivity varies as determined by pressure.

The above data are presented to illustrate the invention. While certain examples, structures, composition and process steps have been described for purposes of illustration, the invention is not limited to these. Variation and modification within the scope of the disclosure and the claims can readily be effected by those skilled in the art.

While the invention has been described with relation to several specific embodiments, especially the ones shown in the drawing, it is believed the invention is not limited thereto but is applicable to the control of any exothermic or endothermic catalyzed chemical reaction. An endothermic reaction in which my invention is utilizable is the oxidation or hydrogenation of vegetable oils, for example in the presence of a catalyst. Broadly, the invention is applicable to the control or manipulation of diluent and reactant input to any chemical reaction zone, exothermic or endothermic. By maintaining close control of the reaction conditions so that they may remain substantially constant by the method and apparatus of this invention, it is possible to improve a uniformity of quality in the ultimate product.

What I claim is:

1. In a process for the polymerization of a 1-olefin by contacting said 1-olefin with a catalyst and a diluent within a smooth continuous path reaction zone in turbulent flow at a temperature such that substantially all of the polymer produced is insoluble in said diluent and is in the form of solid particulate polymer having a density greater than said diluent and polymer product is withdrawn from said zone, the improvement comprising varying the amount of diluent introduced to said zone inversely proportional to the pressure within said zone and varying the amount of polymer product withdrawn from said zone proportional to the pressure within said zone when said pressure attains a predetermined value.

2. The process of claim 1 wherein said polymer product is withdrawn from said reaction zone periodically.

3. The process of claim 1 wherein said pressure is determined by measuring the pressure of the incoming olefin feed.

4. In a process for the polymerization of a 1-olefin by contacting said 1-olefin with a catalyst and a diluent within a smooth continuous path reaction zone in turbulent flow at a temperature such that substantially all of the polymer produced is insoluble in said diluent and is in the form of solid particulate polymer having a density greater than said diluent, the heat of reaction is removed by heat exchange fluid in heat exchange relationship with the reactants and polymer product is wtihdrawn from said zone, the improvement which comprises varying the amount of diluent introduced to said zone inversely proportional to the pressure within said zone, varying the amount of polymer product withdrawn from said zone proportional to the pressure within said zone when said pressure attains a predetermined value and varying the amount of olefin introduced to said reactor as the temperature within said heat exchange fluid changes.

5. The process of claim 4 wherein said product is withdrawn periodically.

6. The process of claim 4 wherein said pressure is determined by measuring the pressure of the incoming olefin feed.

7. In a process for the copolymerization of ethylene and 1-butene by contacting said monomers with the chromium oxide catalyst containing hexavalent chromium associated with an oxide selected from the group consisting of silica, alumina, thoria and zirconia in the presence of a liquid normal pentane within a vertically disposed smooth, closed continuous path reaction zone of uniform cross section at a velocity in the highly turbulent range and a temperature in the range of between about 225° F. and about 150° F. whereby substantially all of the copolymer product is insoluble and suspended in said liquid normal pentane and is in the form of solid particles of copolymer, and a copolymer product is periodically withdrawn, the improvement which comprises increasing the amount of liquid normal pentane introduced to said reaction zone as the pressure within said reaction zone decreases and decreasing the amount of liquid normal pentane introduced to said reaction zone as the pressure within said reaction zone increases and increasing the amount of copolymer product withdrawn from said reaction zone when the pressure within said zone exceeds a predetermined maximum and decreasing the amount of copolymer product withdrawn from said reaction zone when the pressure within said zone drops below a predetermined pressure.

8. The process of claim 7 wherein the heat of reaction is removed by a heat exchange fluid in indirect heat exchange relationship with the reactants and the quantity of ethylene and butene-1 introduced to the reactor is varied inversely proportional to the temperature of said heat exchange fluid during the start-up of the reaction.

9. Apparatus comprising, in combination: a tubular closed reactor with smooth bends, said reactor being substantially free from internal obstructions; conduit means for introducing olefin reactant, polymerization catalyst and liquid hydrocarbon diluent into said reactor; means for continuously propelling the contents of said reactor therethrough at a velocity in the turbulent flow range; product removal means in open communication with said reactor; pressure sensing means disposed so as to determine the pressure within said reactor; a first valve means in communication with said conduit means for introducing diluent into said reactor; a first controlling means operably connected to said pressure sensing means and said first valve means opening further said first valve means in response to a signal from said pressure sensing means indicating that the pressure has decreased and closing further said first valve means in response to a signal from said pressure sensing means indicating that the pressure has increased; a second valve means in communication with said product removal means; and a second controlling means operably connected to said pressure sensing means and said second valve means opening further said second valve means in response to a signal from said pressure sensing means that the pressure has exceeded a predetermined maximum and closing further said second valve means in response to a signal from said pressure sensing means that the pressure has dropped below a predetermined pressure.

10. The apparatus of claim 9 wherein said second valve means is a periodically actuated valve means.

11. The apparatus of claim 9 wherein said pressure sensing means is disposed within the conduit means for introducing olefin to said reactor.

12. The apparatus of claim 9 wherein heat exchange means are disposed in heat exchange relationship with said reactor; temperature sensing means are disposed in the interior of said heat exchange means; a third valve means is in communication with said olefin conduit; and a third controlling means is operably connected to said third valve means and said temperature sensing means opening further said third valve means in response to a signal from said temperature sensing means that the temperature has decreased.

13. Apparatus comprising, in combination: a tubular closed reactor with smooth bends, said reactor being substantially free from internal obstructions and comprising two horizontal tubes and vertical tubes in open communication with each other to form a smooth, continuous flow path; at least one blade type propeller internally located within a vertical tube to continuously move the contents of said reactor therethrough in turbulent flow; inlet conduits in open communication with said reactor for introducing olefin reactant, polymerization catalyst and liquid hydrocarbon diluent to said reactor; product withdrawal conduit in open communication with said reactor; pressure sensing means disposed within the interior of said olefin inlet conduit; a first valve means in communication with said diluent inlet; a first controlling means operably connected to said pressure sensing means and said first valve means opening further said valve in response to a signal from said pressure sensing means indicating that the pressure has decreased and closing further said first valve means in response to a signal from said pressure sensing means indicating that the pressure has increased; a second valve means in open communication with said product withdrawal conduit; a time cycle controller operably connected to said product withdrawal conduit periodically opening and closing said second valve means; a second controlling means operably connected to said pressure sensing means and said time cycle controller increasing the withdrawal rate in response to a signal from said pressure sensing means when the pressure within said reactor has exceeded a predetermined maximum and decreasing the withdrawal rate in response to a signal from said pressure sensing means when the pressure within said reactor has dropped below a predetermined pressure.

14. The apparatus of claim 13 wherein a heat exchange jacket is disposed on the exterior of said reactor forming an annular space with said reactor; an inlet conduit is in open communication with said annular space for incoming heat exchange fluid; an outlet conduit is in open communication with said annular space for outgoing heat exchange fluid; a temperature sensing means is disposed within said annular space; a third valve means is in communication with said olefin inlet conduit; and a third controlling means is operably connected to said olefin inlet conduit and said temperature sensing means opening further said third valve means in response to a signal from said temperature sensing means that the temperature has decreased.

References Cited by the Examiner

UNITED STATES PATENTS

| | | | |
|---|---|---|---|
| 2,351,091 | 6/1944 | Bar | 23—288 |
| 2,376,833 | 5/1945 | Teter | 23—288 |
| 2,769,804 | 11/1956 | Hanson | 260—88.2 X |
| 2,810,630 | 10/1957 | Herle | 23—285 |
| 2,824,090 | 2/1958 | Edwards et al. | 260—88.2 |
| 2,825,721 | 3/1958 | Hogan et al. | 260—88.2 |
| 2,832,674 | 4/1958 | Ranzenberger | 23—285 |
| 2,978,441 | 4/1961 | Sherk | 260—93.7 |
| 3,035,033 | 5/1962 | Schweitzer | 260—95 X |
| 3,087,917 | 4/1963 | Scoggin | 260—94.9 |

JOSEPH L. SCHOFER, *Primary Examiner.*

M. LIEBMAN, *Examiner.*